(12) United States Patent
Kang et al.

(10) Patent No.: US 8,351,183 B2
(45) Date of Patent: Jan. 8, 2013

(54) ELECTRIC DOUBLE LAYER CAPACITOR WITH NON-WOVEN FIBER SEPARATOR

(75) Inventors: Jin-A Kang, Anyang-si (KR); Heui-Soo Kim, Anyang-si (KR); Ha-Young Lee, Anyang-si (KR); Jong-Suk Park, Anyang-si (KR); Jun-Ho Kim, Anyang-si (KR)

(73) Assignee: LS Mtron Ltd., Gyeonggi-Do (KR)

( * ) Notice: Subject to any disclaimer, the term of this patent is extended or adjusted under 35 U.S.C. 154(b) by 580 days.

(21) Appl. No.: 12/392,266

(22) Filed: Feb. 25, 2009

(65) Prior Publication Data
US 2009/0225495 A1    Sep. 10, 2009

(30) Foreign Application Priority Data
Feb. 26, 2008    (KR) .................. 10-2008-0017501

(51) Int. Cl.
*H01G 9/00*    (2006.01)
(52) U.S. Cl. ........................................ 361/502
(58) Field of Classification Search .............. 361/502
See application file for complete search history.

(56) References Cited

U.S. PATENT DOCUMENTS

| | | | |
|---|---|---|---|
| 4,007,059 A * | 2/1977 | Witherspoon et al. | 429/9 |
| 4,216,280 A * | 8/1980 | Kono et al. | 429/247 |
| 4,373,015 A * | 2/1983 | Peters et al. | 429/57 |
| 5,654,114 A * | 8/1997 | Kubota et al. | 429/338 |
| 5,888,916 A * | 3/1999 | Tadokoro et al. | 442/334 |
| 6,349,027 B1 * | 2/2002 | Suhara et al. | 361/502 |
| 6,424,517 B1 * | 7/2002 | Ikeda et al. | 361/502 |
| 7,088,571 B2 * | 8/2006 | Nakamura et al. | 361/502 |
| 2003/0064282 A1 * | 4/2003 | Nakagawa et al. | 429/144 |
| 2009/0117454 A1 * | 5/2009 | Takita et al. | 429/145 |

FOREIGN PATENT DOCUMENTS

| | | |
|---|---|---|
| EP | 1615244 | 1/2006 |
| JP | 61151965 A * | 7/1986 |
| JP | 10069920 A * | 3/1998 |
| KR | 10-2007-0000231 | 1/2007 |
| KR | 10-2008-0015163 | 2/2008 |
| WO | WO 98/11614 | 3/1998 |

OTHER PUBLICATIONS

English translation of Korean Office Action dated Nov. 10, 2009 for Korean Patent Application No. 10-2008-0017501.
Chinese Office Action dated Oct. 29, 2010; English translation of Chinese Office Action dated Oct. 29, 2010 for Chinese Patent Application No. 2009-101185517.

* cited by examiner

*Primary Examiner* — David M Sinclair
(74) *Attorney, Agent, or Firm* — Stroock & Stroock & Lavan LLP

(57) ABSTRACT

An energy storage device includes positive and negative electrodes; positive and negative lead wires connected to the positive and negative electrodes, respectively; a separator composed of unit fibers and positioned between the positive and negative electrodes to electrically insulate the positive and negative electrodes from each other; a housing accommodating the positive and negative electrodes and the separator; an electrolyte received in the housing; and positive and negative terminals connected to the positive and negative lead wires, respectively, wherein an electrolyte permeability index of the separator is larger than an electrolyte permeability index of the electrodes, and the unit fibers of the separator are arranged irregularly so that pores formed in the separator have cross sections of polygonal shapes. Using this energy storage device, the electrolyte of electrodes that gives a direct influence on electric capacity is not depleted. Also, stress failure of the separator may be prevented effectively.

3 Claims, 3 Drawing Sheets

ELECTRIC DOUBLE LAYER CAPACITOR WITH NON-WOVEN FIBER SEPARATOR

CROSS-REFERENCE TO RELATED APPLICATION

This application claims priority to Korean Patent Application no 10-2008-0017501 filed on Feb. 26, 2008 the entirety of which is incorporated herein by reference.

BACKGROUND OF THE INVENTION

1. Field of the Invention

The present invention relates to an energy storage device, and more particularly to an energy storage device in which an electrolyte permeability index of a separator is greater than an electrolyte permeability index of electrodes, and in which unit fibers in the separator are arranged irregularly.

2. Description of the Related Art

Generally, batteries and capacitors are representative electric energy storage devices.

Ultra capacitor, also called super capacitor, is an energy storage device whose features are in the middle between electrolytic condensers and secondary batteries. Due to high efficiency and semi-permanent life span, the ultra capacitor is considered as a next-generation energy storage device that is usable in parallel with or instead of secondary batteries.

Ultra capacitors may be classified into EDLC (Electric Double Layer Capacitor) and pseudo capacitor, depending on energy storing mechanism.

Pseudo capacitor utilizes accumulation of charges on or near an electrode surface, while EDLC utilizes absorption of charges on an electrical double layer at the interface between an electrode and an electrolyte.

The electrical double layer of EDLC is formed at a contact surface between an electrode material surface and an electrolyte by using a material with side surface area such as activated carbon as an active material of the electrode.

In other words, charge layers with different polarities are formed at a border surface of an electrode and an electrolyte solution due to the electrostatic effect. The charge distribution formed as above is called an electrical double layer, and this phenomenon gives a charging capacity like batteries.

However, charging/discharging characteristics of the electrical double layer capacity are different from those of batteries. A voltage-to-time feature of a general battery is exhibited as a plateau graph during a charging/discharging process, but a voltage-to-time feature of an electrical double layer capacitor is exhibited as a linear graph during a charging/discharging process.

Thus, an amount of charged/discharged energy of the electrical double layer capacitor may be easily calculated by measuring its voltage.

Meanwhile, seeing the electricity storing mechanism in the above electrical double layer capacitor, charges are stored in the electrical double layer formed at the interface of an electrolyte, so the electrical double layer capacity utilizes physical accumulation of charges for electricity storage, differently from batteries utilizing chemical reaction. Thus, the electrical double layer capacitor exhibits no performance deterioration caused by repeated uses, and ensures excellent reversible characteristics and long life span.

Thus, the electrical double layer capacitor does not need maintenance, and it is sometimes used instead of batteries in applications demanding long life span.

Meanwhile, the electrical double layer capacitor as mentioned above uses the principle of intercalating/disintercalating charges to/from an electrical double layer formed at the interface between an electrode and an electrolyte, so it has fast charging/discharging characteristics. Accordingly, the electrical double layer capacitor is very suitable as main or auxiliary power source of electric vehicles, road sign lamps and UPS (Uninterrupted Power Supply), which demand large capacities, as well as auxiliary power source of mobile communication devices such as cellular phones, notebooks and PDA.

An electrode of the electrical double layer capacitor having various usages as mentioned above should ensure high energy through wide specific surface, high output through low specific resistance, and electrochemical stability through electrochemical reaction control at the interface.

Thus, activated carbon powder or activated carbon fiber with wide specific surface area is most frequently used as a main material of the electrode, and conductive material or metal powder is mixed or applied thereto by means of injection coating to realize low specific resistance.

In addition, more stable electrode materials are now studied and tinder development by controlling electrochemical side reactions occurring at the electrode interface in various ways.

SUMMARY OF THE INVENTION

The present invention is directed to providing an energy storage device in which an electrolyte permeability index of a separator is greater than an electrolyte permeability index of electrodes, thereby preventing electrolyte depletion for the electrode that gives a direct influence on electric capacity.

The present invention is also directed to providing an energy storage device in which unit fibers of the separator are arranged irregularly, thereby preventing stress failure of the separator in a more effective way.

In order to accomplish the above object, the present invention provides an energy storage device, which includes positive and negative electrodes; positive and negative lead wires connected to the positive and negative electrodes, respectively; a separator composed of unit fibers and positioned between the positive and negative electrodes to electrically insulate the positive and negative electrodes from each other; a housing accommodating the positive and negative electrodes and the separator; an electrolyte received in the housing; and positive and negative terminals connected to the positive and negative lead wires, respectively, wherein an electrolyte permeability index of the separator is larger than an electrolyte permeability index of the electrodes, and the unit fibers of the separator are arranged irregularly so that pores formed in the separator have cross sections of polygonal shapes.

Preferably, the cross sections of the pores in the separator have a maximum width of 2 μm or less.

Here, the separator preferably has a porosity of 50% to 75%.

In addition, the electrolyte permeability index of the separator may be 1.3 to 3 times as great as the electrolyte permeability index of the electrodes.

Preferably, when a pressure of 5 $kg/cm^2$ is applied at a temperature of 20° C. to 200° C., a ratio of an increased length of the separator in comparison to an initial length of the separator (or, a ratio of length elongation) is less than 10%.

In addition, a ratio of a decreased length of the separator entirely dried in comparison to a length of the separator in which the electrolyte is permeated (or, a ratio of length contraction) may be less than 1%.

Preferably, the unit fibers of the separator are pulp.

Also preferably, a length-to-width ratio of the unit fibers of the separator is at least 3.

If the energy storage device of the present invention is used, it is possible to prevent depletion of the electrolyte of electrodes that gives a direct influence on electric capacity.

In addition, stress failure of the separator may be prevented effectively.

REFERENCE NUMERALS OF ESSENTIAL PARTS IN THE DRAWINGS

| 2, 12: current collector | 4, 14: active material layer |
|---|---|
| 10: positive electrode | 20: negative electrode |
| 30: separator | 40: lower housing |
| 50: upper housing | 66: positive terminal |
| 76: negative terminal | |

DESCRIPTION OF THE PREFERRED EMBODIMENT

Hereinafter, preferred embodiments of the present invention will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
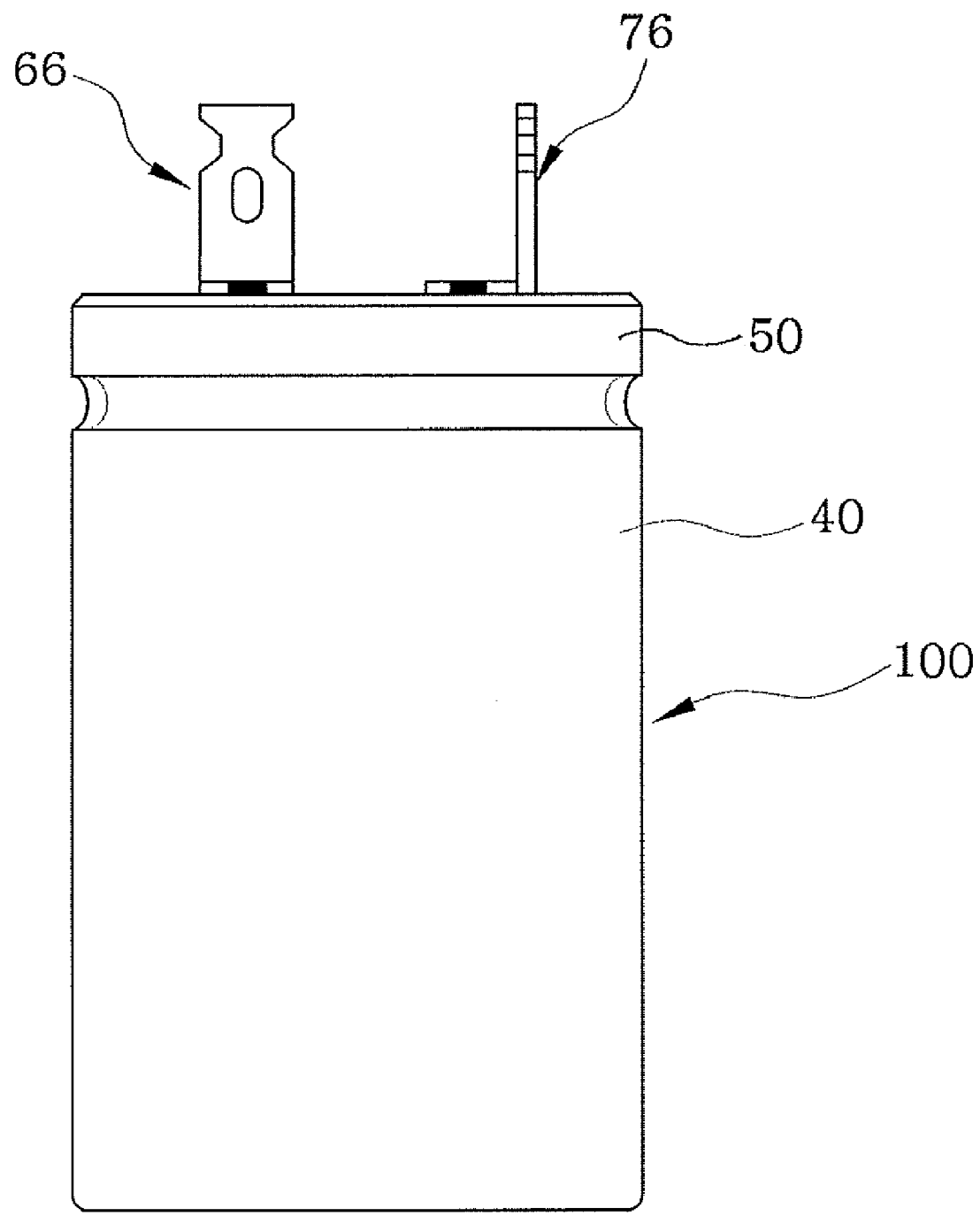
FIG. 1 is a perspective view showing an energy storage device according to the present invention.
Figure 2:
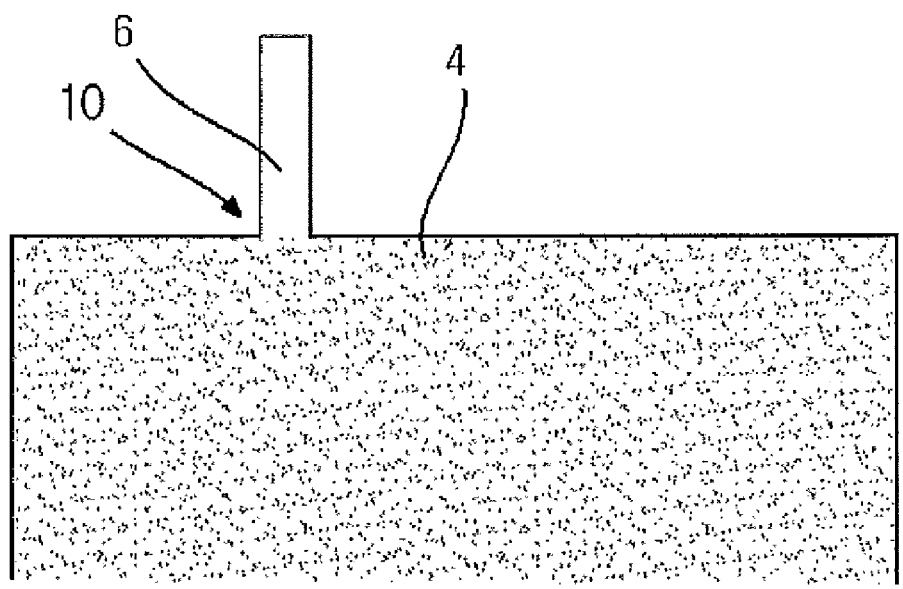
FIG. 2 is a front view showing that an electrode of the energy storage device according to the present invention is connected to a lead wire.
Figure 3:
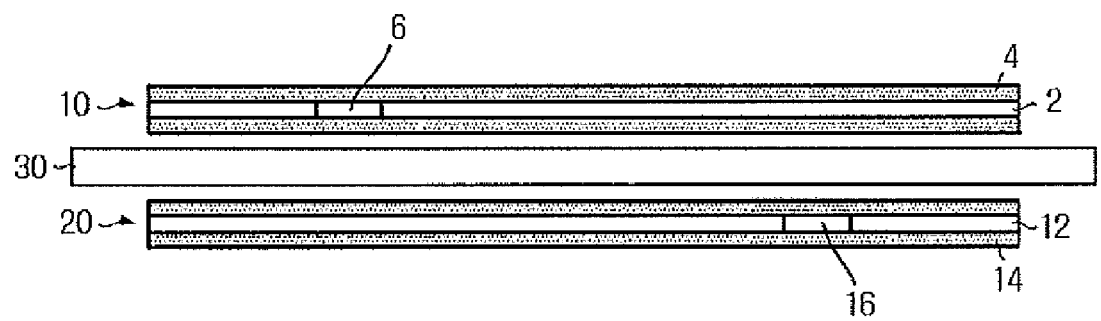
FIG. 3 is a plane view showing arrangements of electrodes, lead wires and a separator of the energy storage device according to the present invention.

FIG. 1 is a perspective view showing an energy storage device according to the present invention, FIG. 2 is a front view showing that an electrode of the energy storage device according to the present invention is connected to a lead wire, and FIG. 3 is a plane view showing arrangements of electrodes, lead wires and a separator of the energy storage device according to the present invention.

Referring to FIGS. 1 to 3, an energy storage device 100 according to the present invention includes a positive electrode 10, a negative electrode 20, a positive lead wire 6, a negative lead wire 16, a separator 30 positioned between the positive and negative electrodes 10, 20 and electrically insulating the positive and negative electrodes 10, 20 from each other, a housing 40, 50 accommodating the positive and negative electrodes 10, and the separator 30, an electrolyte solution received in the housing, and positive and negative electrodes 66, 76 respectively connected to the positive and negative lead wires 6, 16. An electrolyte permeability index of the separator 30 is greater than an electrolyte permeability index of the electrodes 10, 20. Also, the separator 30 is configured such that its pores have polygonal shapes, and unit fibers used for composing the separator 30 are arranged irregularly.

A cell of the energy storage device 100 according to the present invention includes upper and lower housings 50, 40 made of metal material, and a positive electrode 10 and a negative electrode 20 included in the upper and lower housings 50, 40.

The positive electrode 10 includes a metallic current collector 2 and an active material layer 4 made of porous activated carbon. The positive lead wire 6 is connected to one side of the positive electrode 10.

The current collector 2 is configured in a common metal foil form, and the active material layer 4 is formed by broadly applying activated carbon on both surfaces of the metallic current collector 2.

The active material layers 4, 14 store positive/negative electric energy, and the current collectors 2, 12 play a role of passage of charges discharged from or supplied to the active material layer.

A separator 30 for controlling electron conductivity between the positive and negative electrodes 10, 20 is positioned between the positive and negative electrodes 10, 20, which are subsequently stacked. Also, an electrolyte solution is filled in the upper and lower housings 50, 40.

Here, the porous active material layers 4, 14 have approximately circular micropores, which ensures wide surface area. The porous active material layers 4, 14 act as active material identically to the positive and negative electrodes 10, 20, so their surfaces are contacted with the electrolyte solution.

If voltage is applied to the electrodes 10, 20, cation and anion included in the electrolyte solution move toward the positive and negative electrodes 10, 20, respectively, and then into fine pores of the porous active material layers 4, 14.

Figure 4:
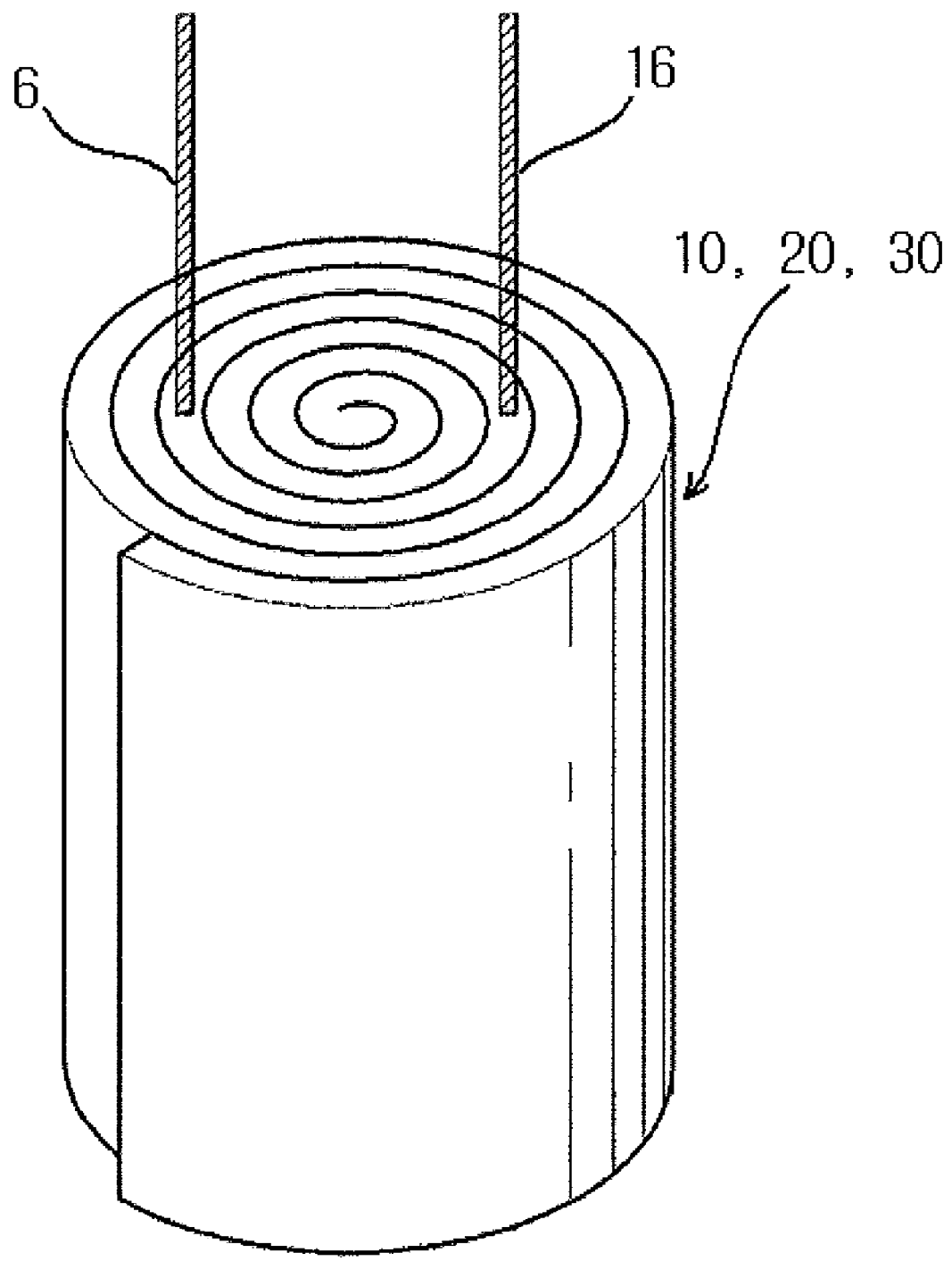
FIG. 4 is a perspective view showing that the positive and negative electrodes and the separator are wound.

The positive and negative electrodes 10, 20 and the separator 30, stacked as mentioned above, are wound as shown in FIG. 4 and then received in the lower housing 40.

The lower housing 40 may be made of metallic or synthetic resin material, preferably aluminum or its alloy.

The lower housing 40 is shown as a cylindrical shape in FIG. 1, but the lower housing 40 may also have other shapes such as a hexagonal shape, not limitedly.

The lower housing 40 is configured to receive the positive and negative electrodes 10, 20, the separator 30 for electrically separating the positive and negative electrodes 10, 20, and the lead wires 6, 16.

The upper housing 50 is coupled to the lower housing 40 at an upper portion of the lower housing 40. The upper housing 50 may also be made of metallic or synthetic resin material, preferably aluminum or its alloy.

Positive and negative terminals 66, 76 are coupled to the upper housing 50 such that the positive and negative lead wires 6, 16 are respectively connected thereto.

Here, the positive and negative terminals 66, 76 may be made of any one of aluminum, steel and stainless steel to ensure mechanical strength, and its surface may be coated with nickel or tin to ensure adhesion by soldering or the like.

The positive and negative terminals 66, 76 are preferably arranged in perpendicular directions to each other on the upper housing 50 within an allowable working error.

As the positive and negative terminals 66, 76 are arranged in perpendicular direction to each other as mentioned above, the positive and negative terminals 66, 76 may give the substantially same supporting force though a bending moment by an external force is applied in any direction.

The separator 30 according to the present invention may be configured by arranging pulp-based or polymer-based unit fibers irregularly by means of the melt-blown process.

The pulp means an aggregation of cellulose fibers obtained from wood or other fiber plants in a mechanical or chemical way. The polymer-based synthetic resin may employ polyethylene, polypropylene or the like.

A conventional separator was made by forming a synthetic resin such as polyethylene into a film shape, and then processing circular micropores therein.

However, in case a synthetic resin such as polyethylene is formed in a film shape, a unit molecule of the resin has a chain-like connection structure, which is elastic flexible in any direction but is not elastically flexible in a direction perpendicular thereto.

In case the separator is broken due to a mechanical or thermal stress, the separator is deprived of its inherent insulating function. Thus, if breakdown of the separator is prevented, the life span of an entire energy storage device is influenced very advantageously.

Thus, the separator 30 of the present invention is configured such that unit fibers of the separator are arranged irregularly, which ensures substantially identical tensile resistance against stresses in all directions.

Here, the melt-blown process may be used for making unit fibers of the separator 30 be arranged irregularly.

The melt-brown process is performed by spraying a hot-melted unit resin through a high-pressure air. The textile webs formed by the above melt-blown process may be compressed by a certain pressure, which makes a non-woven fabric separator.

A non-woven fabric formed by the melt-blown process is configured such that pores formed in the non-woven fabric have polygonal sections, and the size of pores may be controlled by the above compressing process.

In case of the conventional separator formed in a film shape using a synthetic resin such as polyethylene, pores in the conventional separator have circular sections, and the separator is formed in a film shape by compressing the synthetic resin in a melt state.

Thus, the separator of the present invention, formed in a non-woven fabric form as mentioned above, basically has a greater porosity than the conventional separator compressed in a film shape. Also, seeing pore sections, a polygonal section has a greater surface area than a circular section, and the great surface area enhances a capillary power that is an important factor for electrolyte permeability index. Thus, a larger quantity of electrolyte can be received per the same unit volume of the separator.

In this reason, a length-to-width ratio of unit fibers of the separator is preferably at least 3.

In addition, the separator 30 in a non-woven fabric form has a higher electrolyte permeability index than the active material layer 4 applied to both surfaces of the metallic current collector 2.

Since the separator 30 is configured to have a greater electrolyte permeability index than the active material layer 4 as mentioned above, though the electrolyte permeated into the active material layer 4 is depleted due to the heat accompanied with electrochemical reactions, the electrolyte contained in the separator 30 compensates for it, thereby ensuring a longer life span of the entire energy storage device.

Meanwhile, the thickness of unit fibers and the pore size in the separator may be controlled by compressing the unit fibers sprayed for forming the separator. The separator of the present invention is formed such that cross sections of the pores in the separator have a maximum width of 2 µm or less.

If the cross section of the pore has a maximum width exceeding 2 µm, ions in the electrolyte as well as carbon corpuscles in the active material layers 4, 14 may pass through the pores, which may cause current leakage and in a worse case cause short circuit.

Meanwhile, the cross section of the pore has a minimum width that allows ions to pass through it. Ions generally have diameter of 0.2 nm, so the cross section of the pore preferably has a minimum width of about 0.3 nm or more.

The separator preferably has a thickness of 10 to 100 µm. In a state that unit fibers in the separator are irregularly arranged, the unit fibers are stacked to have three-dimensional thickness, so carbon corpuscles cannot pass through the separator.

Porosity of the separator, namely a volume ratio of the pores in the separator to the separator, is preferably 50% to 75%.

If the porosity is less than 50%, it is difficult to achieve the object of the present invention, directed to electrolyte supplement from the separator 30 to the electrodes 10, 20. If the porosity exceeds 75%, the separator may not endure mechanical stress acted at the winding process.

In addition, in case the porosity of the separator is in the above range, it is preferred that an electrolyte permeability index of the separator is 1.3 to 3 times as great as an electrolyte permeability index of the electrodes.

Similarly, if the electrolyte permeability index of the separator is less than 1.3 times as large as the electrolyte permeability index of the electrodes, it is difficult to achieve the object of the present invention, directed to electrolyte supplement from the separator 30 to the electrodes 10, 20. If the electrolyte permeability index of the separator exceeds 2 times as large as the electrolyte permeability index of the electrodes, the separator may not endure mechanical stress acted at the winding process.

Also, in case a pressure of 5 kg/cm$^2$ is applied at a temperature of 20° C. to 200° C., a ratio of an increased length of the separator in comparison to an initial length (namely, a ratio of length elongation) is less than 10%. In addition, a ratio of a decreased length of the separator entirely dried in comparison to a length of the separator in which the electrolyte is permeated (namely, a ratio of length contraction) is less than 1%.

Usually, when the separator is wound together with the electrodes, tensile stress acts on the separator, and thus the separator is elongated as much as a certain ratio in length when being wound.

And, when the electrolyte is depleted due to the heat caused by electrochemical reaction, the separator contracts as much as a certain ratio in length due to the electrolyte depletion.

However, if the ratios of length elongation and contraction exceed 10% or 1%, respectively, pores in the separator are deformed so seriously not to keep the polygonal cross-sectional shape.

And, if the ratio of length contraction exceeds 1% at electrolyte depletion, the separator may be broken due to excessive tensile stress.

Accordingly, in the separator according to present invention, unit fibers included in the separator are arranged irregularly so that stress acting on the separator may be dispersed at contact points among the unit fibers. In addition, the separator having a non-woven fabric form is compressed at a certain pressure such that a ratio of entire length change may be not more than 10% under the above condition.

Embodiments and Comparative Examples

To test performance of the energy storage device according to present invention, the following experiments were performed for embodiments of the present invention and comparative examples.

For quick evaluation of life span characteristic, a high temperature load test was conducted. The entire configuration of the energy storage device used in the test was identically adopted for the embodiments and comparative examples except for the separator.

The high temperature load test is generally used for testing life span characteristics of energy storage devices. At the high temperature load test, after 2000 hours while a voltage is applied at 60° C. of temperature, an increased amount of resistance in comparison to an initial resistance is measured for estimating the life span of the energy storage device.

Generally, after 2000 hours, if the increased amount of resistance is not more than double, it is estimated that the energy storage device has 500,000 cycles of life span.

TABLE 1

| 60° C. | Embodiments | | | Comparative Examples | | |
|---|---|---|---|---|---|---|
| | 1 | 2 | 3 | 1 | 2 | 3 |
| Electrolyte permeability index | 1.545 | 1.32 | 2.15 | 1.23 | 1.27 | Fail to form electrode element |
| Increasing rate of resistance | 181% | 192% | 146% | 249% | 254% | |

In Table 1, an electrolyte permeability index of electrodes was set to 1, and an electrolyte permeability index of the separator was represented in comparison to the electrolyte permeability index of electrodes.

When the electrolyte permeability index was estimated, weight of the permeated electrolyte was measured, and then density of the electrolyte was applied thereto, so the electrolyte permeability index was represented as a ratio that is a dimensionless number.

Embodiment 1 and Comparative Example 1

The energy storage device of the Embodiment 1 was formed such that porosity was 64% and the cross sections of pores had polygonal shapes, and the energy storage device of the Comparative Example 1 was formed such that porosity was 63% and the cross sections of pores had circular shapes.

In the Embodiment 1 and the Comparative Example 1, the porosities were almost the same, but when the cross sections of pores had polygonal shapes, an electrolyte permeability index was greater and current leakage was lower. In addition, an increasing rate of resistance is also lower in the Embodiment 1.

In the Comparative Example 1, it would be understood that the increase of resistance is accelerated when an electrolyte permeability index is lower than 1.3.

Embodiment 2 and Comparative Example 2

The energy storage device of the Embodiment 2 was formed such that porosity was 51% and the cross sections of pores had polygonal shapes, and the energy storage device of the Comparative Example 2 was formed such that porosity was 47% and the cross sections of pores had polygonal shapes.

In the Embodiment 2 and the Comparative Example 2, the cross sections of pores had polygonal shapes identically, but the electrolyte permeability index was changed according to porosities. It would be understood that an electrolyte permeability index at a porosity of 50% or above is increased approximately 30% in comparison to that at a porosity of 47%.

Also, in the Embodiment 2, it would be understood that, when an electrolyte permeability index of separator is larger by approximately 30% than an electrolyte permeability index of electrodes, an increasing rate of resistance is less than 200%, which satisfies resistance characteristic.

Embodiment 3 and Comparative Example 3

The energy storage device of the Embodiment 3 was formed such that porosity was 74% and the cross sections of pores had polygonal shapes, and the energy storage device of the Comparative Example 3 was formed such that porosity was 80% and the cross sections of pores had polygonal shapes.

In the Embodiment 3, an increasing rate of resistance was 146%. Thus, it would be understood that the increase of resistance slows down as the electrolyte permeability index is higher in case the cross sections of pores had polygonal shapes, when compared with the Embodiments 1 and 2.

Meanwhile, in the Comparative Example 3, due to the high porosity, the separator could not stand mechanical tensile stress caused by being wound, so it was impossible to form an electrode element.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An electric double layer capacitor, comprising:
   positive and negative electrodes;
   positive and negative lead wires connected to the positive and negative electrodes, respectively;
   a separator positioned between the positive and negative electrodes to electrically insulate the positive and negative electrodes from each other;
   a housing accommodating the positive and negative electrodes and the separator;
   an electrolyte received in the housing; and
   positive and negative terminals connected to the positive and negative lead wires, respectively,
   wherein the separator is a non-woven fabric formed by means of a melt-blown process so that pores formed in the non-woven fabric have cross sections of polygonal shapes, and
   wherein the cross sections of the pores in the separator have a maximum width of 2 μm or less, and
   wherein a length-to-width ratio of unit fibers of the separator is at least 3, and an electrolyte permeability index of the separator is 1.3 to 3 times as great as an electrolyte permeability index of the electrodes, and
   wherein when a pressure of 5 $kg/cm^2$ is applied at a temperature of 20° C. to 200° C., a ratio of an increased length of the separator in comparison to an initial length of the separator is less than 10%, and a ratio of a decreased length of the separator entirely dried in comparison to a length of the separator in which the electrolyte is permeated is less than 1%.

2. The electric double layer capacitor according to claim 1, wherein the separator has a porosity of 50% to 75%.

3. The electric double layer capacitor according to claim 2, wherein the unit fibers of the separator are pulp.

* * * * *